(12) United States Patent
Baranton et al.

(10) Patent No.: US 8,414,721 B2
(45) Date of Patent: Apr. 9, 2013

(54) METHOD OF APPLYING A COATING ON A FACE OF A LENS, AND APPARATUS FOR IMPLEMENTING SUCH A METHOD

(75) Inventors: Konogan Baranton, Charenton-le-Pont (FR); Herve Jouffroy, Charenton-le-Pont (FR); Ahmed Haddadi, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 12/376,222

(22) PCT Filed: Jun. 26, 2007

(86) PCT No.: PCT/FR2007/001063
§ 371 (c)(1), (2), (4) Date: Feb. 3, 2009

(87) PCT Pub. No.: WO2008/017740
PCT Pub. Date: Feb. 14, 2008

(65) Prior Publication Data
US 2010/0006219 A1    Jan. 14, 2010

(30) Foreign Application Priority Data
Aug. 4, 2006    (FR) ...................................... 06 07143

(51) Int. Cl.
*B32B 37/10*    (2006.01)

(52) U.S. Cl. .......................................... 156/64; 156/285

(58) Field of Classification Search .................... 156/64, 156/285, 356, 363, 580, 582
See application file for complete search history.

(56) References Cited

U.S. PATENT DOCUMENTS

| | | |
|---|---|---|
| 2,298,037 A | 10/1942 | Crandell |
| 3,482,371 A | 12/1969 | Moore |
| 3,560,076 A | 2/1971 | Ceppi |
| 3,964,958 A | 6/1976 | Johnston |
| 4,707,208 A | 11/1987 | Crumbach et al. |
| 5,503,694 A | 4/1996 | Abrams |
| 6,481,482 B1 | 11/2002 | Shimotomai |

FOREIGN PATENT DOCUMENTS

| | | |
|---|---|---|
| EP | 0 026 140 | 4/1981 |
| EP | 0 100 265 | 2/1984 |
| GB | 2 253 917 | 9/1992 |
| WO | 97/35216 | 9/1997 |
| WO | 03/004255 | 1/2003 |

OTHER PUBLICATIONS

International Search Report dated Feb. 6, 2008, from corresponding PCT application.

*Primary Examiner* — Christopher Schatz
(74) *Attorney, Agent, or Firm* — Young & Thompson

(57) ABSTRACT

Described is a method and a device for applying a coating film (63) on a face (108) of an optical element (100), including placing the coating on the face of the lens with an adhesive interface (46) placed between the coating and the lens, and inflating a membrane (62) towards the lens in order to press the coating against the lens. Provision is made to adjust the position of the lens relative to the membrane, the adjustment being distinct from the inflation of the membrane.

3 Claims, 3 Drawing Sheets

METHOD OF APPLYING A COATING ON A FACE OF A LENS, AND APPARATUS FOR IMPLEMENTING SUCH A METHOD

TECHNICAL FIELD TO WHICH THE INVENTION APPLIES

The present invention relates in general to fabricating dark and/or correcting ophthalmic lenses for eyeglasses. More particularly, the invention relates to a method and a device for applying a coating on a face of a lens, and to a device for transferring said coating onto the face of the lens.

TECHNOLOGICAL BACKGROUND

In order to improve the physical and/or optical properties of an ophthalmic lens, it is known to cover its main faces in one or more treatment layers presenting desired optical or physical properties, on one or both faces of the lens. Usually, the lens is dipped in a bath or a coating is applied in liquid form by centrifuging, or indeed by vacuum deposition of mineral or organic layers.

Recently, proposals have been made to use a solid coating in the form of a film that is initially carried by a support, which coating is transferred onto the corresponding face of the lens by adhesive bonding. A difficulty then consists in applying the coating carried by its support against the corresponding face of the lens in such a manner firstly as to ensure that no bubbles of air are trapped between the lens and the coating while it is being applied, and secondly as to spread the adhesive over the entire surface of the lens in order to distribute it in substantially uniform manner without any zones having too little or too much adhesive. It is also appropriate to obtain a thickness of adhesive that is well adapted to holding the coating well on the lens and to preserving the optical properties of the lens.

In its embodiment shown in FIGS. 3A and 3B, document WO 03/004255 proposes a method of applying a coating film on a face of an ophthalmic lens, the film being carried by a support and the method comprising:

placing the support together with its coating film on the face of the lens, an adhesive interface being placed between the coating film and the lens; and inflating a membrane towards the lens in order to press the coating film against the lens.

The Applicant has found that such a method is not suited to applying a coating film on lenses that present geometrical characteristics that differ from one another, as applies with dark or correcting ophthalmic lenses for which the surface shape needs to be adapted to the vision correction requirements of the wearer, and also to the shape of the selected frame. For some lenses, the adhesive is not distributed over the entire surface of the lens, which can degrade proper retention of the coating on the lens. The thickness of the adhesive can also be too thin or on the contrary too thick.

With some lenses it also happens that there does not remain sufficient adhesive at the center to ensure the coating is properly held. Finally, the coating itself is sometimes flattened in certain portions, and that can degrade its physical and/or optical properties.

OBJECT OF THE INVENTION

The object of the present invention is to improve adhesively bonding the coating for lenses that present physical or geometrical characteristics that differ from one another.

To this end, the invention provides a method of applying a coating film on a face of a lens, the method comprising:

depositing the coating film on the face in question of the lens, an adhesive interface being deposited between the coating film and the lens; and inflating a membrane towards the lens to press the coating film against the lens;

wherein provision is made for adjusting the position of the lens relative to the membrane, this adjustment being distinct from the inflation of the membrane and being performed as a function of at least one characteristic of the lens.

The invention also provides a device for applying a coating film on a face of a lens, the film previously being deposited on the face in question of the lens, the device comprising:

a seat for the lens;

a membrane comprising a fixing portion and an inflatable portion;

inflater means for inflating the membrane towards the seat of the lens, said inflater means including holder means for holding the fixing portion of the membrane, and pressurizing means for pressurizing the inflatable portion of the membrane;

wherein provision is made for adjustment means for adjusting the position of the lens seat relative to the fixing portion of the membrane, this adjustment being performed as a function of at least one characteristic of the lens.

During inflation of the membrane, the membrane presses progressively on the coating film with the zone on which it presses enlarging from the center of the lens towards its periphery. Adjusting the position of the lens, or of its seat, relative to the membrane enables the spatial distribution of the pressure exerted by the membrane on the coating film for application and also the intensity of said pressure to be adapted to each optical element, and it also enables the way in which the distribution of said pressure on the face of the lens is varied to be adapted to each optical element.

Thus, the way the coating film is pressed against the lens can be governed so as to obtain a good distribution of pressure for properly spreading the adhesive, or adhesive interface, from the center of the lens towards its periphery, and so that the thickness of the adhesive is substantially constant over the entire area so as to guarantee that the coating is properly held.

Controlling the pressure exerted by the membrane on the lens also serves to avoid deforming the lens or even breaking the coating film or its support.

In the field of ophthalmic optics in particular, the prescription laboratory is thus provided with a device and a method for applying a coating on an eyeglass lens that makes it possible to improve the quality with which the coating is held on the lens for lenses presenting different physical or geometrical characteristics.

According to a first advantageous characteristic of the invention, the adjustment means include determination means suitable for determining the position at which the lens seat is to be set relative to the fixing portion of the membrane. It is thus possible to determine the favorable distance between the lens seat and the membrane for obtaining good distribution of the pressure pressing the coating film on the lens.

According to another advantageous characteristic of the invention, said position adjustment is performed as a function of at least one physical or geometrical characteristic of the lens. The physical or geometrical characteristic of the lens has a considerable influence on the spatial distribution on the pressure with which the coating is pressed against the lens, and also on the intensity of that pressure. Determining the distance at which the lens, or its seat, needs to be set relative to the membrane as a function of these characteristics serves to improve the application of the coating on each lens presenting physical and/or geometrical characteristics that are specific thereto, while guaranteeing that the lens and the coating are unharmed.

According to another advantageous characteristic of the invention, the physical or geometrical characteristic of the lens on which said position adjustment depends comprises the thickness at the center and/or the thickness at the edge of the lens. For a lens that is thick, the distance from the lens to the membrane is increased in order to compensate for the extra thickness and limit the pressure at the center of the lens (the membrane being centered on the center of the lens), thus leaving a sufficient thickness of adhesive in the central portion of the lens, whereas for an optical element that is thin, the distance is decreased so as to obtain sufficient pressure at the center of the lens to expel the adhesive towards the periphery of the lens. The relative distance to be set between the lens and the membrane is thus determined as a function of the thickness of the lens and/or the thickness of the coating, optionally together with its support, so that the intensity of the pressure of the membrane enables the coating to be applied correctly over the entire extent of the lens.

According to another advantageous characteristic of the invention, the physical or geometrical characteristic of the lens on which said position adjustment depends comprises a curvature of the lens and/or of a coating film support. The relative distance to be set between the lens and the membrane is thus determined as a function of the curvature of the lens and/or of the support in such a manner that the distribution of pressure from the membrane enables the coating to be applied correctly over the entire extent of the lens.

According to another advantageous characteristic of the invention, the physical or geometrical characteristic of the lens on which said position adjustment depends comprises the material of the lens and/or of the coating film and/or of a coating film support. Taking account of the material of the lens, of the coating, or of its support serves to avoid breaking or excessively deforming the lens, the coating, or its support.

According to another advantageous characteristic of the invention, the physical or geometrical characteristic of the lens on which said adjustment depends, comprises a diameter of the lens. Taking the diameter of the lens into account serves to improve the uniformity with which the coating is applied over the entire extent of the lens.

According to another advantageous characteristic of the invention, the adjustment means include control means for controlling the position of the lens seat relative to the fixing portion of the membrane, which control means are driven by driver means as a function of data provided by the determination means. The means for driving the control means enable the lens or its seat to be moved to its determined position relative to the membrane in automatic manner.

According to another advantageous characteristic of the invention, said position adjustment comprises prepositioning the lens in an initial position. Prepositioning makes it possible for a simple offset of the initial position of the lens to be used, for each optical element, to optimize the spatial distribution of the pressure exerted by the membrane on the lens, and also the intensity of said pressure.

According to another advantageous characteristic of the invention, said position adjustment comprises dynamically driving the position of the lens during inflation of the membrane. Varying the position of the lens enables the intensity of the pressure on the various portions of the lens to be varied so as to optimize spreading of the adhesive, or the adhesive interface, and thereby optimize application of the coating over the entire extent of the lens.

According to another advantageous characteristic of the invention, said position adjustment comprises driving the variation in the position of the lens relative to the membrane in application of at least one predetermined function of time. This predetermined function may be obtained by previously performing a plurality of tests. It is thus possible to vary the position of the lens in application of a variation function of behavior that is known and that can combine the improvements of earlier tests.

According to another advantageous characteristic of the invention, the predetermined function of time is selected from a predefined plurality of predetermined functions of time. It is thus possible to select the predetermined function of time that is the most favorable to applying the lens coating, given the conditions under which the coating is applied, such as the characteristics of the lens.

According to another advantageous characteristic of the invention, the predetermined functions includes at least one movement of the lens away from the membrane, followed by at least one movement of the lens towards the membrane. This back-and-forth movement enables the adhesive, or the adhesive interface, to be better distributed over the lens, thus making it possible to obtain a substantially more uniform thickness for the adhesive, or the adhesive interface, and thereby hold the coating better on the lens.

According to another advantageous characteristic of the invention, the adjustment comprises driving the variation in the position of the lens relative to the membrane in application of a function that depends on the force exerted on the lens. Dynamically driving the position of the lens as a function of the force being exerted enables the distribution of the adhesive, or the adhesive interface, to be governed over time in such a manner as to exert sufficient force on the lens to spread the adhesive over the entire extent of the lens while benefiting from a sufficient thickness of adhesive to ensure that the coating is properly held.

According to another advantageous characteristic of the invention, the face of the lens on which the coating is to be applied is concave. Typically, for an optical element of the ophthalmic lens type, the lens is generally delivered with its convex face already machined and coated in appropriate coating. It is this machining of the concave face that makes it possible to obtain a lens having values for its optical and geometrical characteristics that comply with the values prescribed for the wearer. After this concave face has been machined, it then remains to apply the selected coating thereto. Inflation of the membrane generates a pressure-applying surface that matches substantially the concave face of the lens, thereby enhancing the distribution of pressure over the concave face of the lens for the purpose of applying the coating on the concave face of the lens. The device of the invention for applying the coating on the concave face of the lens is thus particularly well suited to the requirements of the optician.

According to another advantageous aspect of the invention, said adjustment of the position of the lens relative to the membrane takes place prior to and/or simultaneously with inflating the membrane.

According to another advantageous characteristic of the invention, for a lens that is to be provided with a holder block, the lens seat is suitable for receiving the holder block. The holder block serves to conserve the frame of reference of the lens and thus to conserve the geometrical configuration of the face of the lens that is used for the adjustment in order to optimize application of the coating on the face of the lens.

The invention also provides a device for automatically transferring a coating film onto a face of a lens, the device comprising:
- an applicator device as defined above for applying the coating film on the face of the lens; and at least one of the following devices:
- a cleaner device for cleaning the lens;
- a handler device for handling the coating to take hold of the coating film and place it on the face of the lens;
- an adhesive depositor device for depositing adhesive on the face of the lens and/or on the coating film;

receiver and transport means for receiving and transporting the lens being provided to take the lens from one device to another.

Such a device enables the operator to automate preparation and transfer of the coating onto the lens.

DETAILED DESCRIPTION OF AN EMBODIMENT

The following description with reference to the accompanying drawings of an embodiment, given by way of non-limiting example, shows clearly what the invention consists in and how it can be reduced to practice.

Figure 1:
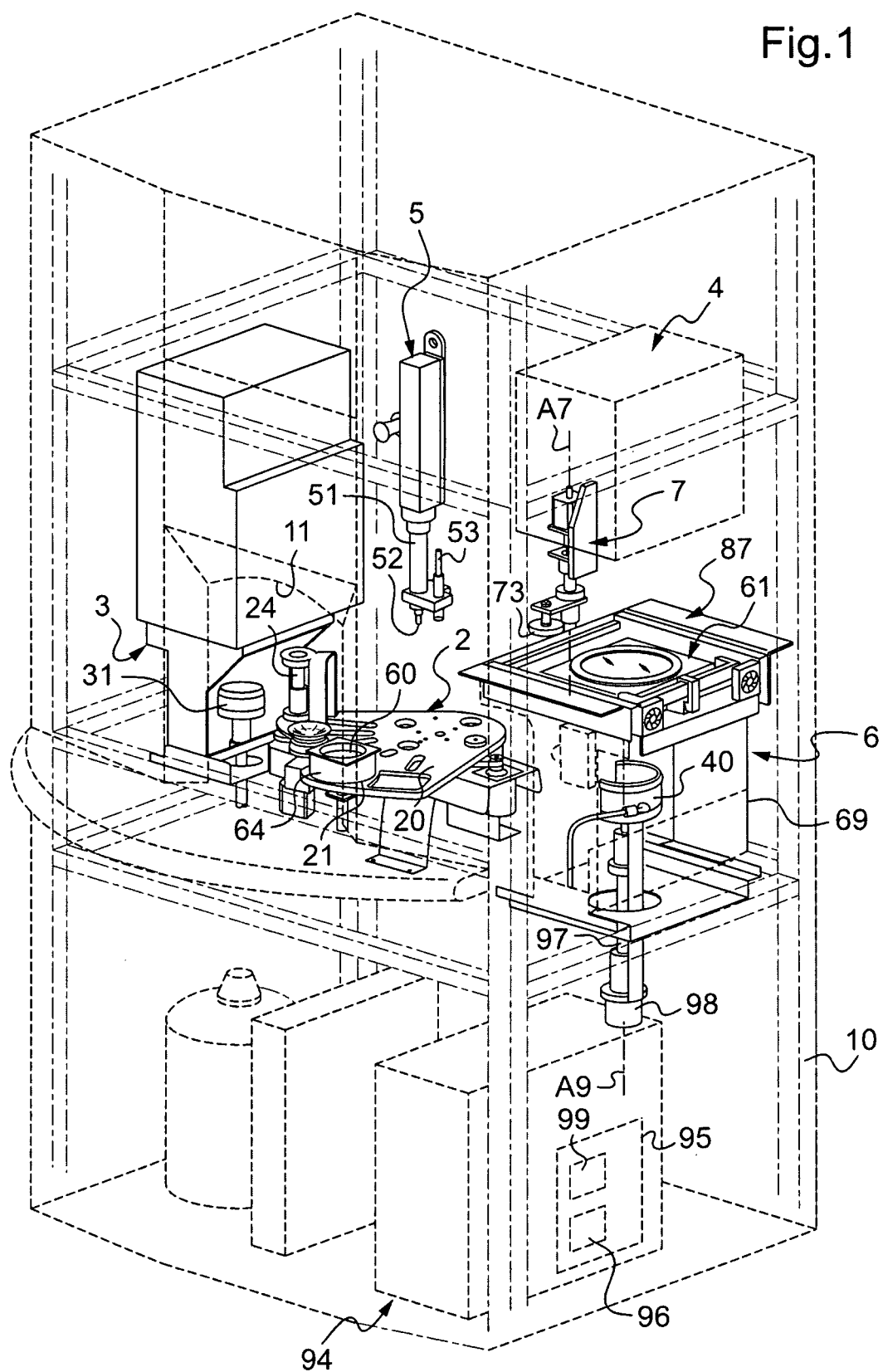
FIG. 1 is an overall perspective view of an apparatus for preparing and transferring a coating.

FIG. 1 shows apparatus for preparing and transferring a coating 63 onto a face 108 of a lens 100. The term lens is used to cover an optical element such as an eyeglass lens, whether correcting or otherwise, an instrument lens, etc. Here, the face 108 of the lens 100 that is to have the coating 63 applied thereto is the concave face 108 of the lens 100. The coating 63 is a water-repellent coating with a thickness of about 50 micrometers.

The coating 63 for transferring is typically in the form of a film that is initially carried by a support 60 enabling it to be handled and packaged. By way of example, the support 60 is constituted by a thin plate of organic material and, specifically, it is elastically flexible.

This preparation and transfer apparatus comprises firstly a frame 10 and a loading and unloading zone defined by an opening 11, or door, serving firstly to load the lens 100 and the support 60 carrying the coating 63 together with its package 64, and secondly to unload the lens 100 once the coating has been deposited on the lens 100.

In order to transfer the coating onto the lens 100, the preparation and transfer apparatus includes the following devices:
- a handler device 7 for handling the coating 63 in order to take hold thereof and place it on the concave face of the lens;
- a cleaner device 3 for cleaning the lens 100;
- an adhesive depositor device 5 for depositing adhesive on the face of the lens 100 and/or on the coating 63;
- an applicator device 6 for applying the coating 63 on the face of the ophthalmic lens, also referred to as an application device 6; and
- a receiver and dispenser device 2 for receiving a lens 100 and suitable for transferring the lens 100 from one device to another.

The apparatus also includes an adhesive hardener device 4. Finally, an electronic processor unit 94 is provided to enable all of these devices to operate in coordinated manner.

These devices are described in greater detail below.

The Dispenser Device

The device 2 for receiving and dispensing the lens 100 essentially comprises a carousel 20 that has freedom of movement in pivoting PIV1 about a first pivot axis A1.

Figure 2:
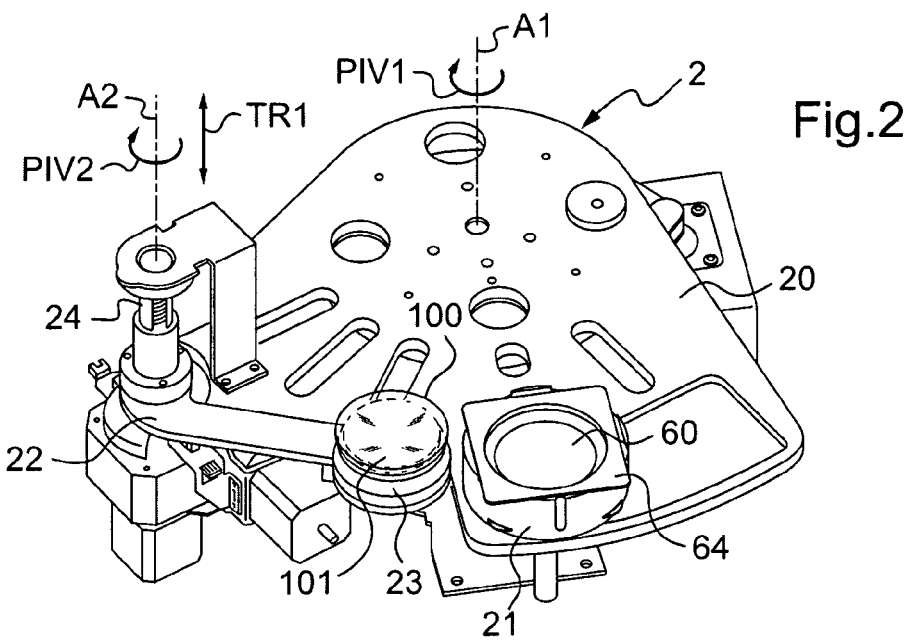
FIG. 2 is a perspective view of a device for receiving and dispensing a lens, the device forming part of the apparatus for preparing and transferring a coating.

As shown in FIG. 2, the carousel 20 includes a housing 21 adapted to receive the support 60 of the coating 63 placed in its packaging 64. The packaging 64 containing the support 60 of the coating 63 rests in the housing 21 with the top face 60A that is opposite from the bottom face 60B carrying the coating 63 facing towards the outside of the package 64, i.e. upwards in the drawing of FIG. 2.

The carousel 20 also has a fork 22 that possesses freedom of movement in pivoting PIV2 about the axis A2 of a bracket 24 secured to the carousel 20, together with freedom of movement in translation TR1 along the axis. The fork also possesses a housing 23.

The Coating Handler Device

The coating handler device 7 includes grip means 73 here constituted by a suction cup movable vertically along an axis A7. The grip means 73 are mounted off-center relative to the axis A7 and also possess freedom of movement in pivoting about said axis A7.

Lens Cleaner Device

The cleaner device 3 has an inlet for enabling the lens to be loaded together with its holder block on a washing base 31. The base is designed firstly to hold the lens and secondly to conserve the orientation of the lens, e.g. by being provided with a shape complementary to the keying element of the holder block, as is the housing 21 in the carousel. Finally, this device includes washing means such as means for spraying jets of water and means for setting the base into rotation so as to dry the lens by centrifuging.

Adhesive Depositor Device

The device 5 for depositing adhesive comprises a motor-driven syringe 51 for dispensing an adhesive 46 that can be hardened by being exposed to ultraviolet (UV) radiation. The syringe is suitable for delivering a precise volume of adhesive at a precise rate. The adhesive depositor device 5 also includes a temperature and humidity sensor 53.

Adhesive Hardener Device

The device 4 for hardening the adhesive 46 is positioned above the device 6 for applying the coating 63 (see FIG. 1) and it includes means for generating UV radiation, e.g. by using xenon gas. It is arranged with the applicator device 6 to be capable of exposing the adhesive 46 to the ultraviolet radiation in such a manner as to cause the adhesive 46 to harden between the coating and the lens. The thickness of the final layer of adhesive 46 lies in the range 3 micrometers to 20 micrometers, and particularly good results are obtained for adhesive having a thickness of about 8 micrometers.

In a variant, provision can be made to use a thermosetting adhesive, in which case the device for exposing the adhesive to UV radiation is replaced by a device enabling the adhesive placed between the lens and the coating to be heated in order to harden it.

Computer and Electronic Processor Unit

The preparation and transfer apparatus includes a computer and electronic processor unit 94 here constituted by one or more electronics cards designed to drive the devices of the preparation and transfer apparatus in coordinated manner, in application of the preparation and transfer method that is described below.

The computer and electronic processor unit 94 comprises, by way of example and in conventional manner: a motherboard, a microprocessor, a random access memory, and a permanent mass memory. The mass memory contains a program for executing the preparation and transfer method as described below. The mass memory is preferably rewritable and is advantageously removable to enable it to be replaced quickly or programmed on a remote computer via a standard interface.

Coating Applicator Device

The device 6 for applying the coating 63 comprises firstly a lens seat 40. Since the lens 100 is provided with a holder block 101 embodying its frame of reference, the lens seat 40 is suitable for receiving the holder block 101 on which the lens is held. The lens seat 40 is constituted in this example by a mandrel adapted to clamp onto and hold several different types of holder block.

Figure 3:
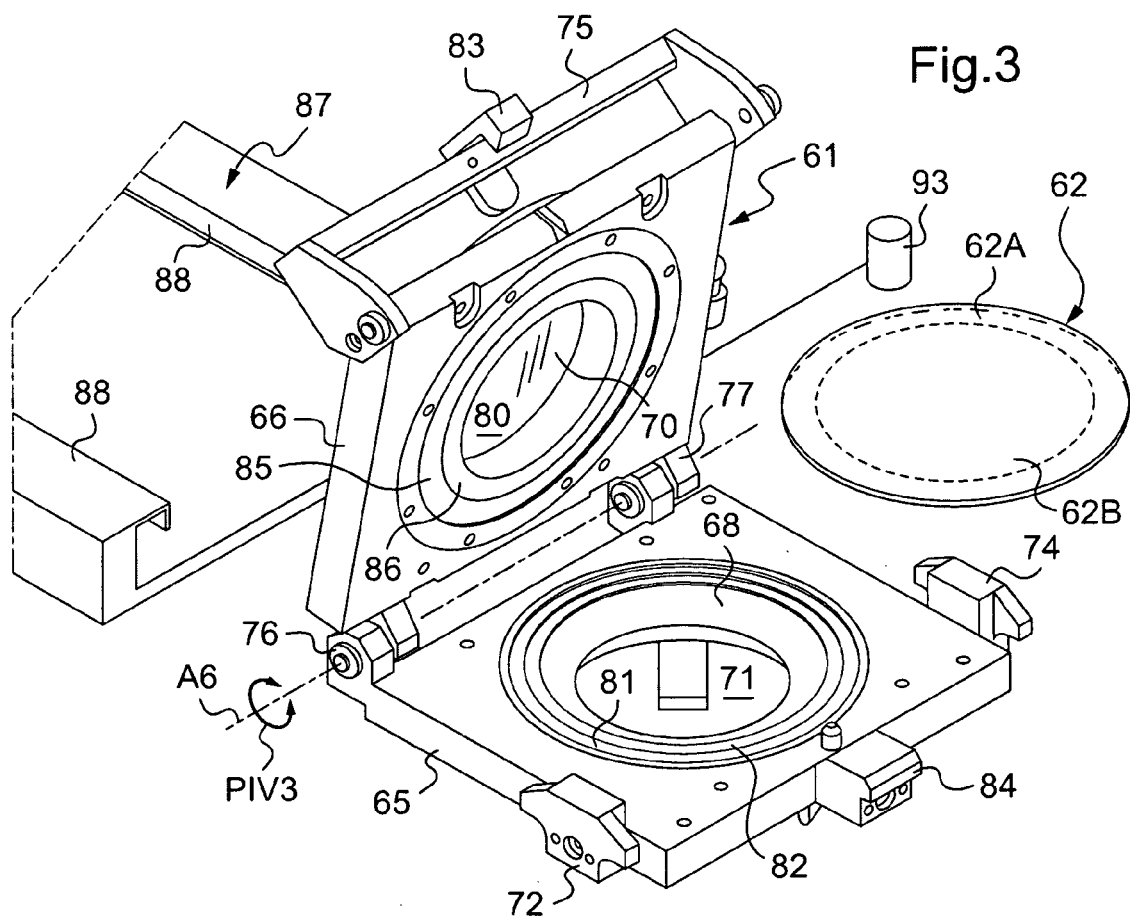
FIG. 3 is a perspective view of a portion of a device forming part of the apparatus and serving to apply the coating on the face of the ophthalmic lens.

As shown in FIG. 3, the applicator device 6 also includes a membrane 62 and inflater means 61 for inflating the membrane 62 towards the lens seat 40. The membrane presents an inflatable portion 62B and a fixing portion 62A.

The inflater means 61 comprise a first plate 66, or top plate, and a second plate 65, or bottom plate, between which the membrane 62 is placed.

The top plate 66 presents a pressurization chamber 80 in a setback, which chamber is connected to a source of compressed gas 93. The pressurization chamber 80 can thus be pressurized to a given value lying in the range 1 bar to 3 bars, and preferably equal to 2 bars.

The top plate 66 also includes a glazed porthole 70 defining part of the pressurization chamber 80 and suitable for transmitting UV radiation. The membrane is also designed to allow UV radiation to pass therethrough (e.g. being made of transparent material).

The bottom face 65 includes a through central opening, and in this example a removable insert that defines a protrusion opening 71 is fitted in this through central opening. The protrusion opening 71 flares towards the membrane 62. In particular, in this example, the protrusion opening 71 of the bottom plate 65 is frustoconical. The smaller section of the cone may be flush with the bottom of the bottom plate (facing towards the seat 40), or it may extend beyond said bottom face forming a projection therefrom. The diameter of the smallest section of the cone is equal to or greater than the diameter of the coating support.

The two plates 66 and 65 are mounted to pivot relative to each other between firstly an open configuration in which the two plates are spaced apart from each other to enable the membrane 62 to be inserted or replaced, and secondly a closed configuration in which the two plates 66 and 65 are pressed one against the other.

The plates 66 and 65 are mounted one on the other by means of hinges 76 and 77 that confer, on the top plate 66, freedom of movement relative to the bottom plate 65 in pivoting PIV3 about a pivot axis A6. A handle 75 is also provided on the top plate 66 enabling the operator to take hold of the top plate 66 so as to cause it to pivot about the pivot axis A6. Locking and clamping means 83 and 84 are also provided for locking and clamping the two plates in their closed configuration. The locking and clamping means 83 and 84 comprise a hook 83 mounted on the handle 75 in such a manner as to engage with a blocking element 84 secured to the bottom plate 65.

In the closed configuration, the two plates 66 and 65 are pressed one against the other in such a manner that firstly the pressurization chamber 80 of the first plate 65 and the protrusion opening 71 of the second plate 66 are situated facing the inflatable portion 62B of the membrane 62, and secondly the peripheral fixing portion 62A of the membrane 62 is held by being pinched between the two plates 66 and 65.

The bottom plate 65 includes stepped circular housings 81 and 82 in a setback configuration, i.e. situated at different depths and having different diameters centered on the protrusion opening of the bottom plate 65. These circular openings 81 and 82 are thus suitable for receiving membranes of diameters corresponding to the diameters of the circular housings 81 and 82. The top plate 66 also has projecting stepped annular portions 85 and 86 of diameters correspond to the diameters of the circular housings 81 and 82. The annular portions 85 and 86 are designed to pinch the peripheral portion 62A of the membrane 62 in the corresponding circular housing 81 or 82.

This peripheral portion 62A of the membrane 62 thus constitutes the fixing portion 62A of the membrane, and the central portion 62B of the membrane, which central portion is free, constitutes the inflatable portion 62B, or inflation portion, of the membrane.

The protrusion opening 71 serves to guide deformation of the inflatable portion 62 of the membrane laterally while it is being inflated.

In a variant, it is also possible to provide for the through central opening of the bottom plate to present flared walls designed to guide the inflating portion of the membrane so as to form the protrusion opening without any need to have recourse to an insert.

A plurality of inserts 68 are provided presenting protrusion openings 71 of different widths. The operator can thus select the insert that is best adapted for applying the coating on the lens and place it in the through central opening of the bottom plate 65.

The two plates 65 and 66 form an extractable subassembly 61. This extractable subassembly 61 is mounted on slides 88 so as to be inserted in and extracted from an associated reception housing 87 like a drawer. The reception housing 87 is secured to the frame 69 of the applicator device 6.

The bottom plate 65 is provided on its side face with elements 72 and 74 that engage in the slides 88 while the extractable subassembly 61 is being mounted in the reception housing 87. The elements 72 and 74 also constitute means for fastening the extractable subassembly in the associated reception housing 87.

Naturally, during the operation of preparing and transferring the coating on the lens, the extractable subassembly 61 remains secured to the frame 69 of the coating applicator device 6.

In practice, after processing a series of about thirty lenses, the membrane is changed. Provision can also be made to change the insert as a function of the characteristics of the lens and/or of the coating support.

The applicator device 6 includes adjuster means 95 for adjusting the position between the lens seat 40 and the fixing portion 62A of the membrane 62. In this example, these adjuster means 95 are incorporated in the computer and electronic processor unit.

Figure 4:
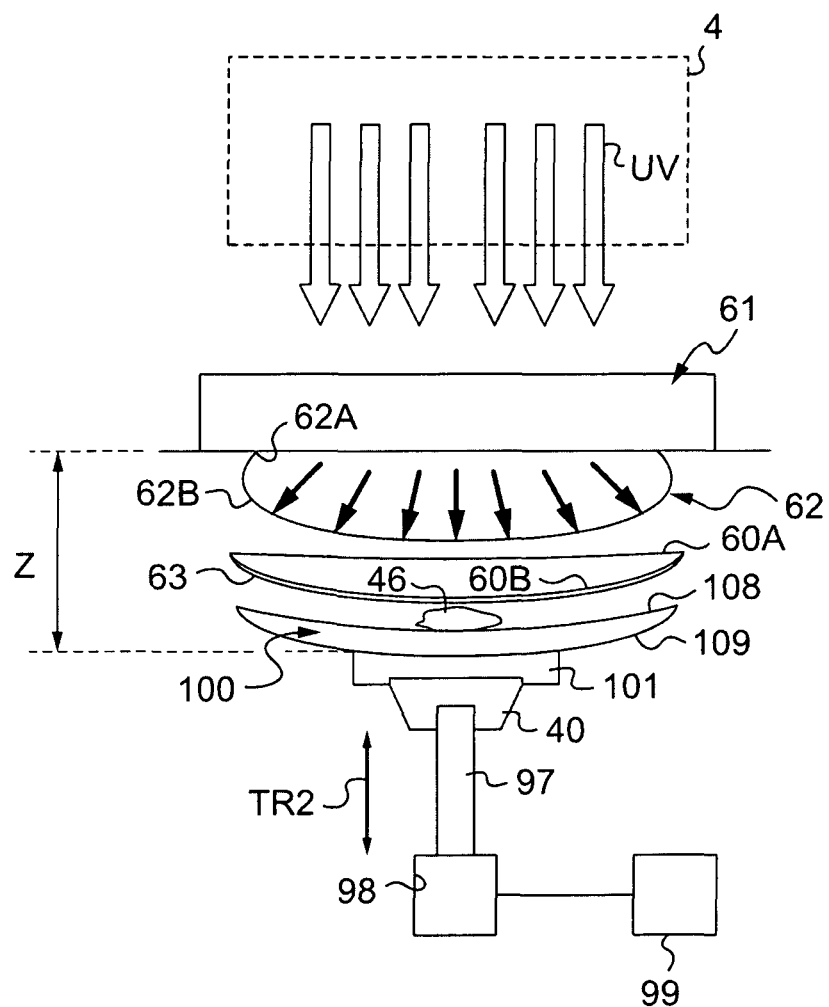
FIG. 4 is a diagrammatic view of the device for applying the coating on the face of the ophthalmic lens.

In order to adjust the position of the lens seat 40 relative to the fixing portion 62A of the membrane 62, the adjustment means 95 adjust the distance Z between the end of the lens seat 40 and the fixing portion 62A of the membrane 62 (FIG. 4).

In the description below, adjusting the position on the lens seat 40 relative to the fixing portion 62A of the membrane 62 is equivalent to adjusting the position of the lens 100 itself relative to the fixing portion 62A of the membrane, since the lens 100 is secured to the lens seat 40 while adjustment is taking place. Similarly, when reference is made to adjusting the position of the lens (or its seat) relative to the membrane (in general), that involves adjusting the position of the lens seat 40 relative to the fixing portion 62A of the membrane 62, i.e. the non-inflatable portion of the membrane.

Here the adjustment means 95 comprise electrical determination means 96 suitable for determining the position to be adjusted of the lens seat 40 relative to the membrane. Here the adjustment means may comprise an electronics card incorporated in the electronic processor unit 94. These determination means 96 are designed and programmed to determine the position for adjustment of the lens seat 40 relative to the membrane as a function of at least one physical and/or geometrical characteristic of the lens 100.

One of the characteristics of the lens 100 that is preferably taken into account is the curvature of the face of the lens 100 that is to have the coating applied thereto, and/or the curvature of the support 60 for the coating 63. Another characteristic of the lens 100 that it is advantageous to take into account is the thickness at the center or the thickness at the edge of the lens 100, or a combination of these two thicknesses.

Other characteristics can also be taken into account such as the material of the lens 100 or the diameter of the lens 100. Account may also be taken of the characteristics of the support 60 for the coating 63 such as its thickness, its diameter, its curvature, and its material. Finally, account may be taken of the characteristics of the coating itself, and/or of the membrane, and/or of the insert.

The adjustment means 95 also comprise control means 97, 98 for controlling the position of the lens seat 40 relative to the fixing portion 62A of the membrane, which controller means are driven by driver means 99. Here the driver means comprise an electronics card incorporated in the electronic processor unit and they are designed and programmed in such a manner that the lens seat 40 is moved to the position determined by the determination means 96.

The control means 97, 98 include an actuator 97 of axis A9 with the lens seat 40 fastened to one end thereof, and a motor 98 connected to the other end of the actuator 97 to move the actuator 97, and thus the lens seat 40, in translation TR2 along the axis A9 of the actuator 97.

Method of Preparing and Transferring the Coating onto the Lens

The concave face 108 of the lens 100 is machined beforehand on a device (not shown) that is adapted for machining the surface of the lens as a function of the values of geometrical and optical characteristics prescribed for the lens 100. The shape of the concave face 108 of the lens 100 as obtained in this way is stored in memory. The lens 100 is then fitted with its holder block 101 in order to conserve the optical frame of reference of the lens 100, in particular its orientation. The frame of reference of the lens 100 is thus known relative to the keying element of the holder block.

Thereafter, the operator places the support 60 for the coating 63 together with its packaging 64 in the housing 21 of the carousel 20. Here, the support 60 for the coating 63 has a bottom face 60B carrying the coating 63 for application on the concave face 108 of the lens 100, and it has an opposite top face 60A.

The support 60 is flexible, and its bottom face 60B presents a geometrical configuration similar to that of the concave face 108 of the lens 100, i.e. the bottom face 60B is concave, of curvature similar to the curvature of the concave face 108 of the lens. Preferably, the bottom face 60B of the support 60 presents a radius of curvature that is a little greater than that of the concave face 108 of the lens, such that the peripheral portion of the coating does not touch the peripheral portion of the lens until after the central portion of the coating 63 has been properly applied against the central portion of the concave face 108 of the lens.

The support 60 may be made of a plastics material or of polycarbonate. The thickness of the support 60 may lie in the range 0.3 mm to 1 mm.

The operator also places the lens 100 together with its holder block in the housing 23 of the fork 22. Here the lens 100 is initially provided with a coating on its concave face 109 that is to be placed in contact with the lens seat 40.

As mentioned above, the holder block 101 is fitted with a keying shape and the housing 23 of the fork 22 presents a keying shape matching that of the holder block so as to enable the holder block 101 to be accurately positioned in the housing 23 while conserving the frame of reference of the lens 100.

Gripping the Coating Support

The carousel 20 pivots in the counterclockwise direction to position the housing 21 that receives the coating support 60 for the coating together with its packaging 64 in register with the coating handler device 7. The gripper means 73 are moved by virtue of their freedom to move in translation along and in pivoting about the axis A7 so as to take hold of the support 60. The gripper means 73 are then raised so as to extract the support 60 from its packaging 64.

Cleaning the Lens

Once the support 60 has been extracted from its packaging 64 and is held by the gripper 73, the carousel 20 pivots in the clockwise direction to position the housing 23 of the fork 22 that receives the lens 100 and its holder block 101 in register with the cleaner device 3. By virtue of the freedoms of the fork 22 to move in pivoting PIV2 and in translation TR1, the lens 100 is positioned in the cleaner device 3. The lens 100 and its holder block 101 are taken and positioned in the receptacle 31 adapted to hold the lens 100 in a known orientation, e.g. by means of a portion of the receptacle being of a shape that is complementary to the shape of the keying element of the holder block 101.

Once the lens 100 and its holder block 101 are placed in the cleaner device 3, jets of water are directed against the lens 100. Thereafter the lens 100 is dried by centrifuging by causing it to spin at a speed of 2200 revolutions per minute (rpm). This washing serves to remove impurities and swarf from the concave face 108 of the lens 100 as can result from the previously-performed machining of said concave face 108.

The lens 100 is rotated during drying in such a manner as to conserve the orientation of the lens 100. Since the angular position of the lens 100 is known, the lens 100 is replaced in the housing 21 while conserving its optical frame of reference.

Depositing Adhesive

The carousel 20 pivots counterclockwise to position the housing 23 of the fork 22 that receives the lens 100 and its holder block 101 in register with the adhesive depositor device 5.

The optical frame of reference of the lens 100 is conserved so the geometrical configuration of the concave face 108 of the lens 100 is still fully known. The electronic processor unit then drives movement of the lens 100, using the freedoms to move in translation TR1 along the axis of the bracket 24 and to pivot PIV2 about said axis A2, in compliance with the geometrical configuration of the lens 100 in such a manner that the tip 52 of the syringe 51 of hardener adhesive does not touch the lens 100 and in such a manner that no drops of adhesive form on the lens 100. The movement of the lens 100 relative to the syringe of adhesive is thus driven so as to deposit lines or spots of adhesive at accurately localized positions on the concave face 108 of the lens 100.

The adhesive 46 is thus deposited in three dimensions on the lens 100 so as to follow the curvature of the lens 100. In particular, this depositing of adhesive is performed continuously and at a controlled distance from the lens 100 so as to avoid creating drops of adhesive.

Transferring the Coating

The carousel 20 pivots in the counterclockwise position to position the lens 100 and its holder block 101 in register with the applicator device 6 for applying the coating 63. The freedoms of the fork 22 to move in pivoting and in translation are mainly used to place the lens in the lens seat 40.

Thereafter, the grip means 73 of the handler device 7 places the support 60 of the coating 63 via the bottom face 60B carrying the coating 63 gently on the concave face 108 of the lens 100 having the hardenable adhesive 46 deposited thereon (FIG. 4).

The adjuster means 95 are then used to adjust the position of the lens 100 relative to the membrane 62, this adjustment being distinct from inflation of the membrane 62. For this purpose, the determination means 96 determine the position to be adjusted of the lens seat relative to the membrane depending on one or more physical or geometrical characteristics of the lens. In a variant, it is also possible to determine the position to be adjusted of the lens seat as a function of physical or geometrical characteristics of the coating itself and/or of the membrane and/or of the insert.

Static Adjustment

In a first implementation, the adjustment comprises prepositioning the lens 100 in an initial position, prior to inflating the membrane 62.

This prepositioning is performed by adjusting the distance Z between the end of the lens seat 40 and the fixing portion 62A of the membrane 62. This distance Z can be adjusted between a minimum value of 20 mm and a maximum value of 40 mm.

The initial distance Z to be adjusted is a function of the various values of physical and geometrical characteristics of the lens for ensuring that the coating is properly applied on the lens. This prepositioning depends, amongst other things, on the diameter of the insert, the material of the lens, the curvature of the concave face of the lens, the thickness of the lens, and the diameter of the lens.

In the examples below, the diameter of the insert is 80 mm, the lens is made of polycarbonate material, and its diameter is 70 mm.

For a lens that is thick at the center (greater than 7 mm), the initial distance Z is adjusted substantially to the maximum value of 40 mm so as to compensate for the decrease in the inflation radius of the membrane due to the large thickness of the lens. Conversely, for a lens having small thickness at the center (less than 2 mm), the distance Z is adjusted substantially to the minimum value of 20 mm.

Similarly, for a lens that is highly curved, i.e. having a rear face presenting a large amount of curvature (e.g. presenting a surface power greater than 7 diopters for a lens made of polycarbonate having a refractive index of 1.5), the initial distance Z is adjusted substantially to the maximum value of 40 mm so that the membrane can extend sufficiently during its inflation so as to reach a radius of curvature that is sufficiently small to match the radius of curvature of the lens. Conversely, for a lens that has little curvature (e.g. presenting a surface power of less than 4 diopters for a lens made of polycarbonate having a refractive index of 1.5), the distance Z is adjusted substantially to the minimum value of 20 mm.

For a lens of medium curvature and/or medium thickness, the distance Z is adjusted substantially to the middle value of 30 mm.

The adjustment of the position of the lens 100 relative to the membrane 62 is performed here prior to inflating the membrane 62. In a variant, provision can be made for the position of the lens 100 relative to the membrane 62 to be adjusted while simultaneously inflating the membrane 62.

Either way, the pressurization chamber of the inflater means is pressurized and the membrane inflates (FIG. 4) so as to extend as a hernia through the protrusion opening 71 in the bottom plate 65. The central portion of the membrane 62 is the first to press against the central portion of the top face 60B of the support which then transmits the pressure force to the central portion of the concave face 108 of the prepositioned lens. Then as it inflates, the membrane 62 exerts a pressure force that extends progressively from the center towards the periphery of the concave face 108 of the lens (via the support 60). The coating 63 is thus applied to the lens 100 from the center of the lens and towards its periphery and simultaneously the adhesive 46 is expelled from the center towards the periphery of the lens.

Dynamic Adjustment

In a second implementation, which may optionally be performed following the first implementation, i.e. after the lens has been prepositioned, the position of the lens 100 is controlled dynamically while the membrane 62 is being inflated.

Dynamic control over the position of the lens 100 relative to the membrane 62 may initially be performed as a predetermined function of time. Here, the predetermined function comprises at least one movement of the lens seat (and thus of the lens 100) in a direction away from the membrane 62, followed by at least one movement of the seat of the lens 100 towards the membrane 62.

The predetermined function may have a plurality of series of movements of the position of the lens seat, each series comprising a first movement followed by a second movement as described above. This back-and-forth movement of the lens 100 serves to improve the distribution of the adhesive 46 and thus of the application of the coating 63 over the entire surface of the concave face 108 of the lens.

This predetermined function of time may be a single function or it may be selected from a plurality of predetermined functions of time. These predetermined functions may be established empirically.

The predetermined function may also be calculated individually for each lens as a function of the physical and/or geometrical characteristic(s) of the lens 100.

In a variant of this second implementation of the invention, provision can be made to drive the control means 97, 98 so as to vary the position of the lens seat 40 relative to the membrane in application of at least one function that depends on the force exerted on the lens 100. This force is preferably measured at the center of the face of the lens by means of a suitable force sensor. Unlike the first and second implementations, this function is not predetermined.

In any event, and in manner similar to the first implementation, the inflation of the membrane exerts a pressure force on the lens that varies in spatial distribution and intensity in compliance with the dynamic driving of the movement of the lens seat 40. This pressure force of the membrane on the lens via the coating support enables the coating to be applied over the entire area of the concave face 108 of the lens.

Whatever the implementation, after the coating has been applied completely over the entire area of the concave face 108 of the lens, going from the center towards the periphery of said concave face 108, the adhesive 46 is exposed to UV radiation emitted by the hardener device 4, thereby hardening the adhesive 46 between the coating and the lens.

Thereafter the carousel 20 returns to its initial loading and unloading position in which the lens housing 23 is positioned in register with the opening 11 of the preparation and transfer apparatus.

Once the adhesive 46 has set, the coating support 60 is withdrawn and a lens is obtained that includes a coating that has been correctly transferred onto the concave face 108 of the lens.

The present invention is not limited to the implementations described and shown, and the person skilled in the art can apply any variant in accordance with the spirit of the invention.

In a variant, provision can be made to replace the actuator on which the lens seat is fastened by a device that is adapted to be positioned at different heights, at discrete levels, such as a ratchet type jack, for example. From charts obtained in empirical manner, the operator can determine from the set of available discrete positions, e.g. as a function of the physical and/or geometrical characteristics of the lens, which position the lens seat is to occupy in order to enhance application of the coating. In this variant, the adjustment means may be manual or automatic.

For approaching the lens seat to the fixing portion of the membrane, provision can also be made to use a rotary device of the carousel type having a plurality of lens seats adapted to receive the lens and its holder block, which seats are situated at heights that are different from one another. It then suffices to turn the carousel in order to select the lens seat for which the distance to the fixing portion of the membrane corresponds to the determined distance and place it in register with the membrane in order to proceed with optimized transfer of the coating onto the lens.

Naturally, whatever the implementation that is performed, other characteristics may be taken into account when determining the distance to be set between the lens seat and the fixing portion of the membrane, such as for example characteristics of the membrane.

The coating may equally well be an anti-reflection coating, an anti-abrasive coating, a coating that withstands impacts, a photochromic coating, a polarizing coating, or some other type of coating. Provision can also be made to implement the above-described invention for producing a lens that includes a stack of two or more coatings.

The invention claimed is:

1. A method of applying a coating film (63) on a face (108) of a lens (100), the method comprising:
  - depositing the coating film (63) on the face (108) of the lens (100), an adhesive interface (46) being deposited between the coating film (63) and the lens (100);
  - inflating a membrane (62) towards the lens (100), said membrane (62) comprising an inflatable portion (62B) and a fixing portion (62A);
  - measuring a force exerted on the lens;
  - prepositioning the lens by adjusting a distance (Z) between the lens (100) and the fixing portion (62A) of the membrane (62), wherein the prepositioning is distinct from the inflation of the membrane (62) and is calculated individually for the lens to which the coating film is applied as a function of at least one characteristic of the lens (100); and
  - adjusting a position of the prepositioned lens as a function of the measured force exerted on the lens by dynamically driving the position of the lens (100) simultaneously with inflation of the membrane (62),
  - wherein the membrane (62) presses progressively on the coating film (62), a zone that the membrane (62) presses enlarging from a center of the lens (100) towards a periphery of the lens (100).

2. The method according to claim 1, wherein said characteristic of the lens (100) on which said prepositioning depends comprises at least one of a thickness at a center and a thickness at an edge of the lens (100).

3. The method according to claim 1, wherein the face (108) of the lens (100) on which the coating (63) is to be applied is concave.

* * * * *

UNITED STATES PATENT AND TRADEMARK OFFICE
CERTIFICATE OF CORRECTION

| | | |
|---|---|---|
| PATENT NO. | : 8,414,721 B2 | Page 1 of 1 |
| APPLICATION NO. | : 12/376222 | |
| DATED | : April 9, 2013 | |
| INVENTOR(S) | : Konogan Baranton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,414,721 B2
APPLICATION NO. : 12/376222
DATED : April 9, 2013
INVENTOR(S) : Baranton et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this
First Day of September, 2015

Michelle K. Lee
*Director of the United States Patent and Trademark Office*